Feb. 24, 1970  R. F. HALLER  3,496,786
CONTROL DEVICE
Filed Feb. 1, 1968
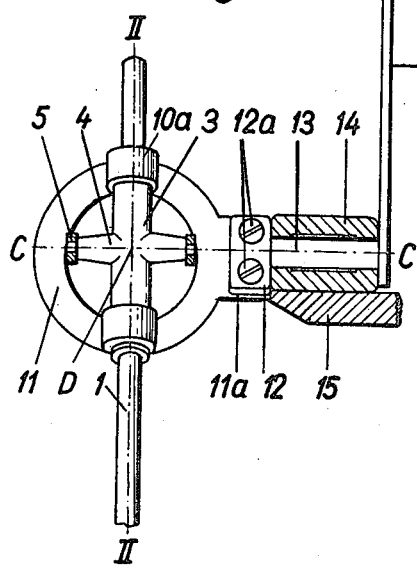
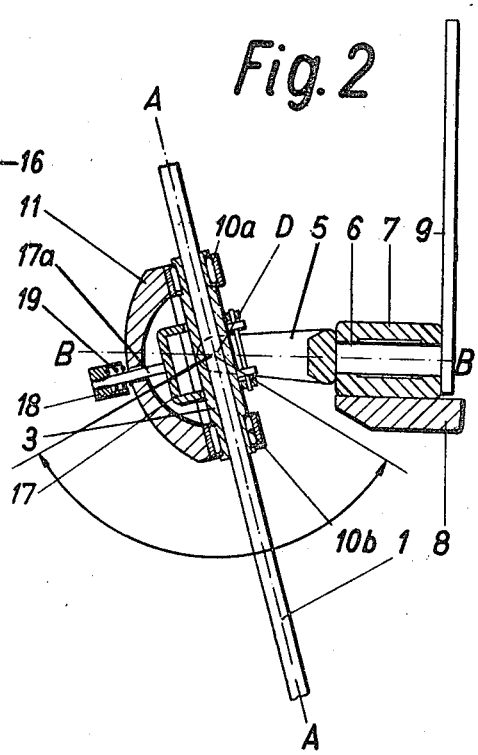
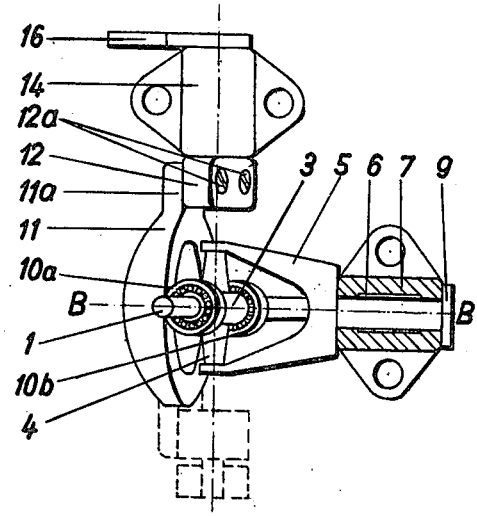
INVENTOR.
Rudolf Friedrich Haller
BY
Alvin Browdy
Attorney

United States Patent Office

3,496,786
Patented Feb. 24, 1970

3,496,786
CONTROL DEVICE
Rudolf Friedrich Haller, Kolliken, Switzerland, assignor to Kern and Company, A.G., Aarau, Switzerland, a corporation of Switzerland
Filed Feb. 1, 1968, Ser. No. 702,378
Claims priority, application Switzerland, Feb. 2, 1967, 1,667/67
Int. Cl. G05g 9/00
U.S. Cl. 74—471                    2 Claims

ABSTRACT OF THE DISCLOSURE

A joint for resolving spatial movements of driving guide rods into rotational movements of two independent driven shafts respectively mounted in separate stationary bearings about axes intersecting at a point disposed on the axis of the driving guide rod.

---

In various control devices and the like, the spatial movement of a driving guide rod has to be resolved into rotational movements of two driven shafts about two axes intersecting at a point. An example of this is the connection of the model spatial guides to the elements by which the photographic plates in evaluation instruments for photogrammetrical evaluation of two stereometrically correlated serial survey photographs are displaced.

Hitherto special joints of complicated construction have been used by which the spatial movement of the driving guide rod is resolved into two rotational movements of two driven shafts. Thus, for example, in one instrument using two such guide rods for photogrammatical evaluations, the two model spatial guide rods are each connected by a joint of this kind to the driven shafts by which the aerial survey photographs are moved in two directions. The hitherto known joints have the substantial disadvantage that they can only be inserted into and removed from the respective instrument as a unit comprising both driven shafts, so that very difficult adjusting operations and a substantial amount of work result which can only be carried out by operators who are specially trained for the job. The replacement of component parts is also very difficult. In accordance with the invention, these disadvantages may be extensively reduced.

The invention relates to a joint for resolving the spatial movement of a driving guide rod into rotational movements of two independent driven shafts, respectively mounted in separate fixed bearings, about two axes intersecting at a point disposed on the axis of the driving guide rod.

In accordance with the invention, the driving guide rod is guided in one part of a cross, the other part of the cross being pivoted in a swivel prong secured to one end of one of the driven shafts. Further in accordance with the invention, one of two roller bearings extending coaxially with the guide rod is provided on each arm of that part of the cross in which the guide rod is guided, the outer rings of the roller bearings running on the edge face of a cup-shaped member secured to a head piece provided on the second driven shaft, so that the edge face of the cup-shaped member is disposed in a plane extending parallel to that part of the cross in which the guide rod is guided at a distance from the axis of the guide rod corresponding to half the outside diameter of the two roller bearings.

In joints of this kind, the two driven shafts and the parts provided thereon can be inserted and withdrawn separately, the replacement of all component parts, which are of a simple construction and can be machined relatively easily, involving no particular difficulty. Joints of this kind can be adjusted much more simply than joints of the known construction. The joint is also very suitable for the transmission or resolution of large dihedral angles of the driving guide rod.

One construction of the joint according to the invention for resolving spatial movements of a driving guide rod into rotational movements of two independent driven shafts mounted in separate stationary bearings, about two axes intersecting in a point disposed on the axis of the driving guide rod, is diagrammatically illustrated by way of example in the drawings, in which FIGURE 1 is a part-sectional plan of the cup-shaped member of the joint;

FIGURE 2 is a section on the line II—II in FIGURE 1, and

FIGURE 3 shows a part-sectional plan of the joint.

A—A is the imaginary axis of the driving guide rod, B—B and C—C being respectively the imaginary axes about which the two driven shafts rotate. The imaginary axes A—A, B—B and C—C intersect at point D. In the illustrated construction, the axes B—B and C—C are perpendicular to each other, this being, however, not absolutely necessary.

A driving guide rod 1 may be turned in all directions, for example through an angle of 120°, about the point D. The guide rod 1 is axially mounted in one part 3 of a cross. The other part 4 of the cross is pivoted in a swivel prong 5 secured to one end of a driven shaft 6 extending coaxially with the imaginary axis B—B. The driven shaft 6 is mounted in a bearing 7 mounted on a fixed support 8 of the instrument provided with the joint. Secured to the end of the driven shaft 6 is a lever 9 by which the part to be moved (not shown in the drawings) is moved in a direction perpendicular to the driven shaft 6. The two arms of part 3 of the cross carry respectively bearings 10a and 10b. The outer rings of the roller bearings 10a and 10b run on the flat edge of a cup-shaped member 11. At a position on its periphery the cup-shaped member is provided with a radially projecting lug 11a which is secured by means of two screws 12a to the prismatic head piece 12 provided at one end of a driven shaft 13 extending coaxially with the imaginary axis C—C. The driven shaft 13 is mounted in a bearing 14 which is provided on a fixed support 15 of the instrument provided with the joint. Secured to the other end of the driven shaft 13 is a lever 16 by which the part to be moved (not shown in the drawings) is moved in a direction perpendicular to the driven shaft 13.

Assuming, for example, a pair of joints hereinbefore described to be used in an instrument for the photo grammetrical evaluation of two stereometrically correlated aerial survey photographs, then the construction and operation will be as follows:

The model space head of the evaluation instrument of known construction provided with the necessary rectifying equipment is connected to the base carriage or slide. One end of a model space guide rod, that is to say of the driving guide rod 1 referring to the joint according to the invention hereinbefore described, provided for each photographic plate is mounted on the base carriage or slide in a universal joint the level of which may be adjusted parallel to the drawing plane, a guide rod 1 passing through the centre of each projection, that is to say through point D referring to the above description, in which centre of projection the joint hereinbefore described is disposed. When the base carriage or slide is displaced on the drawing plane, the two model space guides, that is to say the driving guide rods 1, respectively carry out a spatial rotational movement about their associated point D. According to the displacement of the base carriage or slide, the two photographic plates have to be displaced in two directions which are generally perpendicular to each other. The subdivision of the spatial movement of the model space guides, that is to say, the driving guide rods 1, is produced by a joint of the construction hereinbefore described as follows:

As it carries out its spatial rotational movement, the guide rod 1 held in part 3 of the cross, turns the cross 3, 4 and thus the swivel prong 5 and the driven shaft 6. Simultaneously, a lever 9 mounted on the driven shaft 6 moves the associated photographic plate on its support in a direction perpendicular to the driven shaft 6. The roller bearings 10a and 10b then run on the flat edge of the cup-shaped member 11, and the guide rod 1, through the roller bearings 10a and 10b, turns the cup-shaped member 11, and the driven shaft 13. The lever 16 secured to the driven shaft 13 causes displacement of the associated photographic plate on its support in a direction perpendicular to the driven shaft 13.

As hereinbefore described and illustrated in the drawings, the outer rings of the roller bearings 10a and 10b run freely on the flat edge face of the cup-shaped member 11, there being no connection between the cup-shaped member 11 and the cross 3, 4. The driven shafts 6 and 13 and their associated parts can thus be mounted and dismantled separately. The assembly and adjustment of the instrument are thus substantially facilitated and simplified and all component parts can be readily replaced at considerably less expenditure than that hitherto unavoidable in conventional instruments used for these purposes. The accuracy with which the component motion of the spatial movement of the guide rod 1 is transmitted to the driven shaft 6 is determined by the swivel prong 5, that is to say the bores provided therein for insertion of the arms of part 4 of the cross 3, 4, and by the disposition of the part 4 of the cross relative to the axis of the guide rod. The swivel prong 5 can easily be manufactured with the necessary accuracy, suitable machining of the arms of part 4 of the cross 3, 4 presenting no difficulties. It is important to the accuracy with which the component motion of the spatial movement of the guide rod is transmitted to the driven shaft 13 that the inner and outer rings of the roller bearings 10a and 10b should be exactly circular and concentric with the axis of the guide rod, and that the distance between the axis of the guide rod 1 and the edge face of the cup-shaped member 11, on which the outer rings of the roller bearings 10a and 10b run, should correspond to exactly half the diameter of the outer rings of the roller bearings 10a and 10b. The accuracy may be increased by providing the cup-shaped member 11 with a double bearing as shown in broken lines in FIGURE 3.

The edge face of the cup-shaped member 11 may also be constructed as a conical surface, and the outer rings of the roller bearings 10a and 10b may be of corresponding conical section in order to prevent sliding friction between these parts.

As illustrated in FIGURE 2, the accuracy may be increased and any play between the outer rings of the roller bearings 10a and 10b and their rolling surface on the edge of the cup-shaped member 11 may be avoided by providing a bracket 17 holding the part 3 of the cross. Secured to the back of the bracket 17 is a shaft 17a which passes through a bore provided at a mid-position in the cup-shaped member 11. Screwed to that end of the shaft 17a that is disposed externally of the member 11 is a cap screw 18 containing a compression spring 19 which bears against the periphery of the member 11. The compression spring 19 pulls the bracket 17 and the part 3 of the cross against the cup-shaped member 11, so that the outer rings of the roller bearings 10a and 10b always snugly contact the edge face of the cup-shaped member 11. This addition affects the ready dismantling of the joint only slightly, it being merely necessary first to release the screw 18.

The joint hereinbefore described is suitable for instruments of any construction, for example instruments for determining the trajectory of flying objects of any kind, in which a spatial movement of driving guide rods has to be subdivided into components of motion.

I claim:
1. A control device for resolving spatial movements into two independent rotational movements comprising:
two independent rotary shafts respectively mounted in separate stationary bearings along two axes intersecting at a point;
a driving guide rod having an axis intersecting said point;
a cross element the first part of which contains said guide rod passing axially therethrough, the second part of said cross being pivotally mounted to a swivel prong which in turn is secured to one end of the first of said driven shafts;
a pair of roller bearings extending coaxially with the guide rod and mounted on the first part of the cross through which the guide rod passes;
a cup shaped member provided on the second of said driven shafts, said pair of roller bearings being adapted to run on the edge face of said cup-shaped member, said cup-shaped member being disposed in a plane extending parallel to the first part of said cross through which said guide rod passes, the distance from the axis of the guide rod to the edge face of the cup shaped member corresponding to half the diameter of the two roller bearings.

2. A control device according to claim 1 wherein the first part of said cross is mounted in a bracket to the back of which is secured a shaft passing through a bore provided in said cup shaped member, nut means on the end of said shaft beyond said cup shaped member, a compression spring pressed between the periphery of the cup-shaped member and said nut means which compression spring pulls the bracket against the cup-shaped member, so that the outer rings of the roller bearing are pressed against the edge face of the cup-shaped member, the edge face serving as a track for the outer rings of the roller bearings.

References Cited
UNITED STATES PATENTS

| | | | |
|---|---|---|---|
| 3,095,754 | 7/1963 | Mayon et al. | 74—471 |
| 3,308,675 | 3/1967 | Jonsson | 74—471 |
| 3,365,975 | 1/1968 | Hathaway | 74—471 |

MILTON KAUFMAN, Primary Examiner